May 18, 1948. J. L. TURNER ET AL 2,441,856
CYCLICAL PROCESS FOR THE MANUFACTURE OF TITANIUM DIOXIDE
Filed Aug. 1, 1942
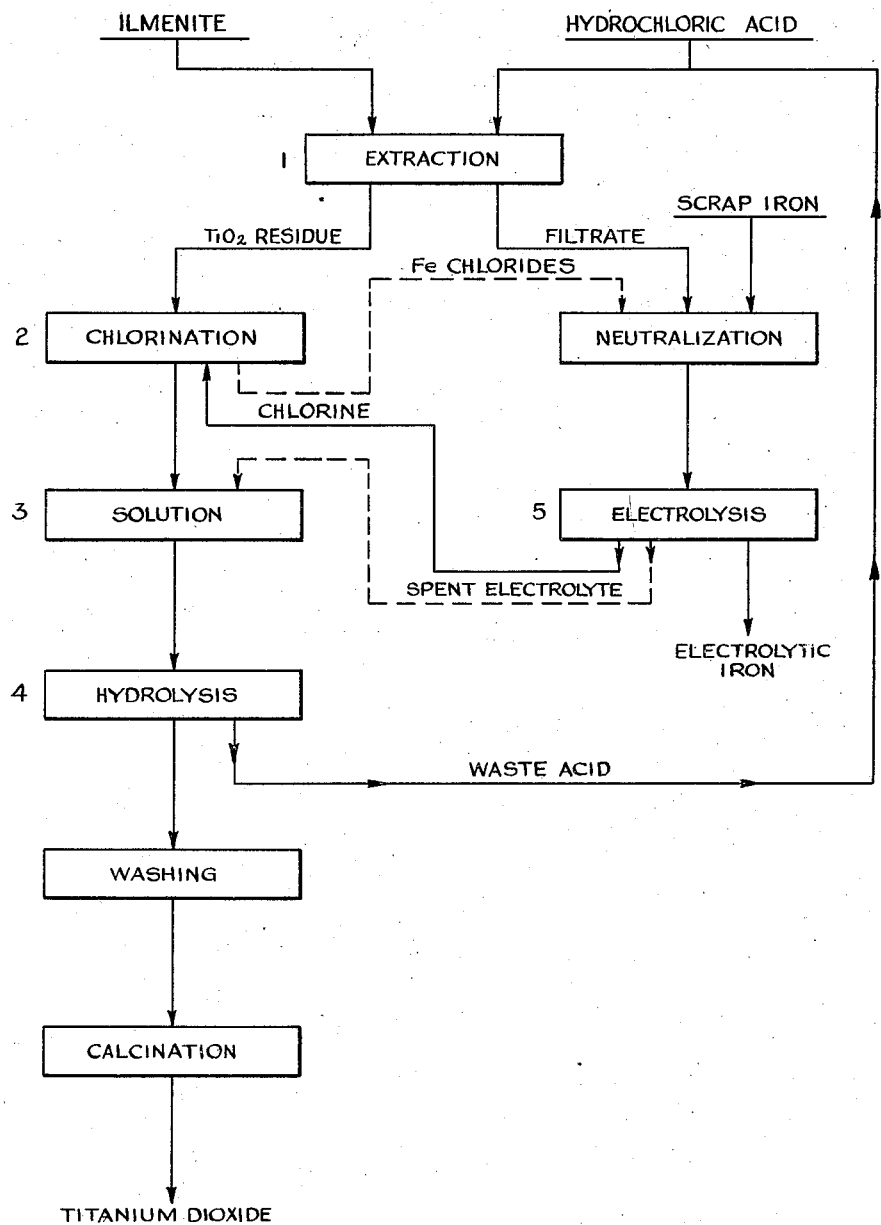
INVENTORS:
JOSEPH L. TURNER
BY WALTER W. PLECHNER
Charles F. Kaegebel ATTORNEY Patented May 18, 1948

2,441,856

UNITED STATES PATENT OFFICE 2,441,856

CYCLICAL PROCESS FOR THE MANUFACTURE OF TITANIUM DIOXIDE

Joseph L. Turner, Fair Haven, and Walter W. Plechner, Metuchen, N. J., assignors to National Lead Company, New York, N. Y., a corporation of New Jersey Application August 1, 1942, Serial No. 453,300

4 Claims. (Cl. 23—202)

The present invention relates to a cyclical process for the manufacture of titanium dioxide pigments. It has particular reference to the production of such pigments by methods wherein hydrous titanium oxide is hydrolytically precipitated from hydrochloric acid solutions of titanium. It has further reference to methods for preparing titanium dioxide pigments which include the chlorination of a titanium-bearing material yielding vapors of titanium tetrachloride from which, by dissolution, the hydrolysis solution is obtained.

A principal object of the invention is to provide a commercially feasible, cyclical process starting with titanium-bearing materials, including titaniferous ores, e. g., ilmenite, as well as compounds of titanium which may contain iron. Another object of the invention is to provide means, included within the steps of this cyclical process, for the neutralization of by-products and waste acids obtained therefrom. Still another object of the invention is to provide means, included within the steps of this cyclical process for the production of valuable electrolytic iron and chlorine, the latter suitable for reuse in the cyclical process. These and other objects of the invention will become apparent from this description.

In effect, the invention embraces several steps comprising what may be regarded as a major cycle and a minor cycle. The principal steps may be enumerated as follows:

1. The extraction of a titanium-bearing material, e. g., ilmenite, with hydrochloric acid yielding a solid titanium concentrate containing some iron and an iron-containing solution.

2. Chlorination of the titanium concentrate to obtain titanium tetrachloride and a minor amount of iron chlorides.

3. Dissolution of the titanium tetrachloride.

4. Hydrolysis of the titanium tetrachloride solution yielding hydrous titanium oxide and spent hydrochloric acid solution which is reused in step No. 1.

5. The iron containing solution obtained from step No. 1 is electrolyzed yielding electrolytic iron and chlorine, the latter being reused in step No. 2.

The two cycles and the steps above referred to will be explained broadly with reference to the accompanying drawing which is a flow sheet.

In the drawing, step No. 1 is the extraction of ilmenite with hydrochloric acid. The hydrochloric acid is shown as being derived from the spent hydrolysis acid. It will be understood that in starting the process fresh hydrochloric acid will have to be employed and while the process is being carried out additional amounts of hydrochloric acid may be required in order to compensate for losses. An iron-containing titanium oxide concentrate will be obtained which is chlorinated in step No. 2 yielding anhydrous titanium tetrachloride which is dissolved in the step No. 3 and hydrolyzed in the step No. 4. The resulting waste hydrochloric acid is returned for extraction in step No. 1. This constitutes the major cycle.

The minor cycle is shown in the drawing, wherein the filtrate obtained from the extraction step, which is principally an iron chloride solution, reduced by means of scrap iron and which may be enriched by the addition of the iron chlorides obtained in the chlorination step is electrolyzed in step No. 5 yielding metallic iron and chlorine gas the latter being reused in the chlorination step. This constitutes the minor cycle.

As also shown by the drawing, the effluent, or catholyte liquor, obtained from the electrolysis, will consist essentially of a dilute solution of unelectrolyzed iron chloride, some free hydrochloric acid and possibly also a salt, for instance, calcium chloride added prior to electrolysis as anolyte.

If desired, all or part of the electrolysis effluent may be employed in the dissolution of the anhydrous titanium tetrachloride or it may be processed further to recover the iron and chlorine values.

From the drawing, it will be seen that the end products of the invention are; first, hydrous titanium oxide and, second, electrolytic iron. As shown by the drawing, the hydrous titanium oxide is subject to washing and calcination treatments in order to produce pigmentary titanium dioxide. The electrolytic iron may be sold as such.

The various steps embraced by the present invention will now be further explained in detail in order to permit those skilled in the art to practice the invention.

1. *The extraction step*

In carrying out the first extraction to initiate the cyclic process of the invention, finely divided titanium bearing material is treated with hydrochloric acid in any convenient manner which will leave as a residue the major portion of the titanium contained in the starting material, for instance, under reflux or by a two-step counter current treatment. To this end it is preferable that the extraction be carried out at an elevated temperature. It has been found that if this treatment is carried out below about 70° C., a considerable portion of the titanium will enter into the solution. It is preferable that the operation be carried out at higher temperatures even up to the boiling point. Thus, finely divided titanium bearing material, e. g., ilmenite ore, may be mixed with strong hydrochloric acid and the mixture heated to the boiling point under reflux condenser and heated until the ore is completely decomposed. For the start of the cycle the hydrochloric acid should preferably be concentrated. The ordinary commercial concentrated hydrochloric acid which has a specific gravity of about 1.16 and contains about 32 per cent HCl may be used at this point. After the process is in operation the waste acid hydrolysis liquor will be used for the extraction. This waste acid should have a concentration above about 18% HCl, below which figure the concentration should not be allowed to fall if the extraction is to be efficiently carried out. For the best result an excess of hydrochloric acid over that theoretically required for the dissolution of all the hydrochloric acid-soluble constituents of the ore should be used, for instance, an excess of about 35 per cent.

If desired, this leaching step may be carried out according to the well known counter current principle.

When the extraction is finished, the reaction mixture is allowed to cool and the titanium concentrate separated from the solution in any convenient manner, for instance, by filtration or decantation. The liquid portion is subsequently electrolyzed as will be described; the titanium concentrate dried, briquetted, and chlorinated.

2. The chlorination step

The titanium concentrate, in order to be rendered adaptable for chlorination, is preferably briquetted by first mixing the titanium concentrate with a reducing agent, for instance, a carbonaceous reducing agent, e. g., powdered carbon, and a binding agent. The binding agent will consist of any suitable substance such as tar, waste sulfide liquor sludges from the paper making industry, or any other suitable material which will serve to hold the titanium concentrate and powdered reducing agent together in the form of a briquette. The mixture of concentrate, reducing agent, and binding agent will next be briquetted in an apparatus adapted for this purpose. The proportions of the mixture will generally be about one part of reducing agent for five parts of concentrate and about one-half to one part binding agent.

Prior to chlorination, the briquettes should be carbonized in order to drive off most of the hydrocarbons which otherwise, during the chlorination, would tend to produce excessive quantities of phosgene and hydrochloric acid. Both of these substances are objectionable, since they constitute a direct loss of chlorine gas.

For the actual chlorination, the briquettes are charged into a chlorination tower of the usual design. Chlorine and air are admitted with the application of heat. When the reaction commences, which is evidenced by the appearance of vapors from the top of the tower, the heat may be discontinued because the reaction, being of exothermic nature, develops sufficient heat to maintain itself. For the best results, the chlorination should be carried out at temperatures above about 600° C. The vapors will consist largely of titanium tetrachloride contaminated with some iron chloride vapors which are condensed. The titanium tetrachloride may be separated if desired from the iron chloride in any convenient manner, for instance, by decantation, filtration or by fractional distillation. The iron chloride if separated is mixed with the filtrate from the extraction step which is now ready for electrolysis. The titanium tetrachloride is dissolved to form an aqueous solution which constitutes the hydrolysis solution for the hydrolytic precipitation of hydrous titanium oxide. In dissolving the titanium tetrachloride, care should be exercised that the dissolution does not develop a temperature sufficient to cause the hydrolysis of the titanium tetrachloride. Hence, it is desirable, when dissolving the titanium tetrachloride, to keep the solution cooled by artificial means. Generally speaking, the dissolution should not be carried out above about 50° C.

The dissolution of the titanium tetrachloride may be carried out to yield solutions of any concentration convenient for hydrolysis. In order to obtain a maximum yield of hydrous titanium oxide which upon calcination gives products of the best quality, the dissolution should be carried out in such manner as to obtain solutions having a titanium concentration of between about 150 and 350 grams per liter calculated as titanium dioxide, $TiO_2$.

3. Hydrolysis of titanium tetrachloride solution

The hydrolysis may be carried out in any well known manner. The solution may be heated to the boiling point, in which case a thermal hydrolysis will occur; nuclei may be employed in order to facilitate the hydrolysis and to improve the quality of the resultant hydrous titanium oxide. Under certain conditions, in order to overcome the dispersing effect of the chloride ion, it is desirable that the hydrolysis solution contain a minor amount of coagulating polyvalent negative ions added preferably as the acids or soluble salts of such acids as sulfuric, phosphoric, arsenic, citric, oxalic, tartaric, etc. Alternatively, the coagulating ions may be contained in the washing water in order to render the precipitate more easily filterable.

When the thermal hydrolysis is complete, the mother liquor is separated from the precipitated hydrous titanium oxide by filtration and/or decantation. The mother liquor will consist principally of hydrochloric acid which is reused in a subsequent treatment of additional titanium-bearing material. By proper adjustment of the concentration of the hydrolysis liquor, a waste acid may be obtained having a hydrochloric acid concentration of over 18 per cent suitable for the extraction step.

4. Electrolysis step

The filtrate obtained from the extraction step will consist essentially of dilute free hydrochloric acid containing a major amount of iron as ferrous and ferric chlorides originally present in the titanium-bearing material. It may have been enriched by the addition of the iron chlorides obtained from the chlorination step. Prior to electrolysis the solution should be treated in order to neutralize substantially the free hydrochloric acid contained therein and to reduce the iron content from ferric to ferrous condition. The neutralization may be effected by adding to the solution any convenient acid-binding agent, e. g. an oxide, hydroxide or carbonate of lime and the reduction effected by means of a reducing agent. The neutralization and reduction can conveniently be combined by using scrap iron which serves both to neutralize the acid and reduce the ferric iron to ferrous. The electrolysis is carried out in a suitable cell of standard design preferably equipped with a permeable membrane providing anode and cathode compartments and provided also with a carbon anode and iron cathode. The neutralized and reduced extraction liquor, which for optimum electrolysis efficiency may contain a small amount of free hydrochloric acid, is introduced into the cathode compartment. Certain salt solutions, for instance, a calcium chloride solution, which have been found useful as anolytes may be introduced into the anode compartment. The electrolysis is conducted to liberate chlorine gas at the anode and deposit electrolytic iron at the cathode. Good results are obtained when using current densities of about 2–10 amperes per square decimeter.

After electrolysis the spent electrolyte may be employed in the dissolution of titanium tetrachloride while the electrolytically deposited iron is ready for marketing as such. In the foregoing it will be evident that the three principal constituents of the reacting materials, viz., the titanium, the iron, and the chlorine are fully recovered except for such small chemical and mechanical losses as are incurred in any chemical process, and it is furthermore evident that no undesirable by-products are accumulated.

The titanium dioxide pigments obtained from the present invention by washing, calcination and the other usual after treatments, consist of rutile titanium dioxide, which because of its rutile crystalline structure and principally because of its higher refractive index, will have a tinting strength and hiding power in the order of about 30 per cent higher than pigments which consist of anatase titanium dioxide.

In order fully to illustrate the invention, the following example will serve:

*Example*

5,034 grams of finely ground ilmenite containing about 43 per cent $TiO_2$, 27 per cent iron as $Fe^{++}$ and 8.4 per cent iron as $Fe^{+++}$ were treated under reflux condenser at the boiling point with 15,090 cc. of hydrochloric acid containing 225 grams per liter HCl which was equivalent to about 3,405 grams total HCl. During the treatment the charge was stirred mechanically at the elevated temperature until about 95 per cent of the iron oxides present in the ore were extracted. The residue ore concentrate which contained about 99.5 per cent of the titanium present in the ore (0.5 had been dissolved in the extracted liquor) was filtered and washed.

The filtrate from the ore extraction consisted essentially of free hydrochloric acid, and ferrous and ferric chlorides at approximately the same proportion as the ferrous and ferric iron are present in the original ore. It was neutralized with powdered lime to an acid concentration of 0.1 HCl and reduced by the addition of 950 grams of metallic iron. As neutralized and reduced, it contained about 6,200 grams $FeCl_2$, having been enriched by the addition of iron chlorides recovered from a preceding chlorination step; it had a specific gravity of about 1.25.

The titanium concentrate which was obtained for the hydrochloric acid extraction was prepared for chlorination by mixing with a predetermined amount of pulverized coal and tar; 20 parts of coal, 15 parts of tar, and 100 parts of dry concentrate, the latter containing about 82 per cent $TiO_2$ and from 3.5 to 4 per cent Fe. The mixture was dried and briquetted. The briquettes were then carbonized to drive off most of the hydrocarbons.

The carbonized briquettes were then charged into a chlorination tower provided with means for supplying heat, chlorine gas, and oxygen; and at the top an outlet for the vapors of iron and titanium. Chlorination was carried out at a temperature of about 700°. A yield of about 96 per cent of the titanium and iron was obtained in the chlorination equal to about 4,890 grams of titanium tetrachloride and 247 grams of iron chlorides calculated as $FeCl_3$. The efficiency of the chlorination was found to be about 90 per cent, most of the balance constituting mechanical losses and a fixed loss of chlorine as phosgene and hydrochloric acid. The vapors of iron and titanium chlorides were condensed, the iron chlorides being insoluble in titanium tetrachloride, were removed by filtration, and, as aforesaid, added to the filtrate from the extraction step. The titanium tetrachloride was carefully diluted with water to obtain a solution containing 290 grams of titanium, calculated as $TiO_2$, per liter. To this was added a sufficient amount of titanium nuclei to constitute about 6 per cent of total titanium in the solution. The nuclei was prepared by heating a titanium tetrachloride solution containing 20 grams per liter of titanium, calculated as $TiO_2$, to 85° C. for about fifteen minutes. The mixture was then boiled under reflux for about 45 minutes, after which time 98 per cent of the titanium had been precipitated as highly pure hydrous titanium oxide. The hydrous titanium oxide was separated from the mother liquor by filtration; it was washed, calcined, and pulverized, yielding a high grade rutile titanium oxide pigment having a tinting strength of about 1700 according to the Reynolds' method.

The waste acid hydrolysis to which was added the wash water from the hydrous titanium oxide liquor consisted essentially of hydrochloric acid and contained 225 grams per liter HCl representing a recovery of about 90 per cent of the total hydrochloric acid. This was held for use in connection with a new batch of ground ilmenite.

In the meantime, the neutralized and reduced iron chloride solution was subjected to an electrolysis in an electrolytic cell having a carbon anode and an iron cathode, using a density current of about 0.3 ampere per square inch. Ninety-six per cent of the iron and chlorine contained in the electrolysis solution was recovered; the iron as a highly pure electrolytic iron equal to about 2,617 grams Fe and the chlorine gas equal to about 3,337 grams $Cl_2$. The latter, after drying with sulfuric acid, was employed in the chlorination of a new batch of titanium concentrate. As 3,337 grams of chlorine represent approximately 78 per cent actual chlorine required for the chlorination of a concentrate obtained from 5,034 grams of ilmenite of the type employed, about 933 grams of make-up chlorine had to be added in subsequent chlorination.

In the foregoing example it will be seen that only about 22 per cent make-up chlorine is required for the continuation of the minor, or chlorination cycle, of the invention. About 95 per cent of all iron originally present in the titanium bearing material and the scrap iron employed as a reducing agent is recovered as highly valuable electrolytic iron. About 92 per cent of all the titanium present in the starting material is recovered as a high grade pigmentary titanium dioxide.

It is to be understood that many modifications may be employed in the practice of the invention without departing from the scope thereof, for instance, as noted above, the extraction step may be in the nature of a one-step treatment or a counter current operation in two or more steps; in carrying out the neutralization of the extraction liquor, instead of lime, iron oxide, or oxides together with metallic iron, as a reducing agent may be employed; it may be desired to reduce the ferric chlorides to ferrous chlorides electrolytically; it may be desired to concentrate the extraction liquor, thereby removing part or all of the free HCl prior to reduction. It is also to be understood that the extent to which the iron contained in the titanium-bearing material is to be removed in the extraction step may be varied considerably, depending upon how much iron it is desired to have in the extraction solution or how much iron it is desired to remove during the chlorination step as iron chloride. Furthermore, the values above given for the recovery of iron, titanium, and chlorine are only representative of the invention when carried out according to the above example. Depending upon the efficiency with which the two cycles are carried out, the proper design of apparatus, etc., higher efficiencies may be obtained.

We claim:

1. A cyclical process for the preparation of titanium dioxide which comprises leaching an iron-bearing titanium ore with an amount of hydrochloric acid having a concentration of at least 18% HCl up to about 35% in excess of that theoretically required for dissolution of all hydrochloric acid-soluble constituents of the ore other than titanium at temperatures above about 70° C. until a solution is obtained containing substantially all the said hydrochloric acid-soluble constituents consisting essentially of iron chloride and a residue consisting essentially of the titanium constituents of the said ore, mixing the titanium residue with a carbonaceous reducing agent and a binder, briquetting the mixture, carbonizing the briquettes, chlorinating said briquettes at temperatures between about 600° C. and about 700° C., separating the resulting titanium chlorides from any iron chloride formed during chlorination, dissolving the titanium tetrachloride in aqueous solution to obtain a solution having a titanium concentration between about 150 grams and 350 grams per liter calculated as titanium dioxide, $TiO_2$, hydrolyzing the titanium chloride solution until over 90% of the titanium is precipitated as hydrous titanium oxide with formation of a hydrochloric acid mother liquor, washing and calcining the said hydrous titanium oxide, neutralizing substantially all the free hydrochloric acid contained in the iron chloride solution and reducing any ferric iron contained therein to ferrous condition, electrolyzing the neutralized and reduced solution at current densities of between about 2 and about 10 amperes per square decimeter to obtain metallic iron and chlorine gas, returning the hydrochloric acid hydrolysis mother liquor to a subsequent leaching of fresh ore and returning the electrolytically produced chlorine gas to the chlorination of the briquetted titanium residue obtained from the leaching.

2. A cyclical process for the preparation of titanium dioxide which comprises leaching an iron-bearing titanium ore with an amount of hydrochloric acid having a concentration of at least 18% HCl up to about 35% in excess of that theoretically required for dissolution of all hydrochloric acid-soluble constituents of the ore other than titanium at temperatures above about 70° C. until a solution is obtained containing substantially all the said hydrochloric acid-soluble constituents consisting essentially of iron chloride and a residue consisting essentially of the titanium constituents of the said ore, mixing the titanium residue with a carbonaceous reducing agent and a binder, briquetting the mixture, carbonizing the briquettes, chlorinating said briquettes at temperatures between about 600° C. and about 700° C., separating the resulting titanium chlorides from any iron chloride formed during chlorination, dissolving the titanium tetrachloride in aqueous solution to obtain a solution having a titanium concentration between about 150 grams and 350 grams per liter calculated as titanium dioxide, $TiO_2$, hydrolyzing the titanium chloride solution until over 90% of the titanium is precipitated as hydrous titanium oxide with formation of a hydrochloric acid mother liquor, washing and calcining the said hydrous titanium oxide, neutralizing substantially all the free hydrochloric acid contained in the iron chloride solution and reducing any ferric iron contained therein to ferrous condition, electrolyzing the neutralized and reduced solution at current densities of between about 2 and about 10 amperes per square decimeter to obtain metallic iron and chlorine gas, returning the hydrochloric acid hydrolysis mother liquor to a subsequent leaching of fresh ore and returning the electrolytically produced chlorine gas to the chlorination of the briquetted titanium residue obtained from the leaching and the spent electrolyte to the dissolution of titanium tetrachloride.

3. A cyclical process for the preparation of titanium dioxide which comprises leaching ilmenite ore with an amount of hydrochloric acid having a concentration of at least 18% HCl up to about 35% in excess of that theoretically required for dissolution of all hydrochloric acid-soluble constituents of the ore other than titanium at temperatures above about 70° C. until a solution is obtained containing substantially all the said hydrochloric acid-soluble constituents consisting essentially of iron chloride and a residue consisting essentially of the titanium constituents of the said ore, mixing the titanium residue with a carbonaceous reducing agent and a binder, briquetting the mixture, carbonizing the briquettes, chlorinating said briquettes at temperatures between about 600° C. and about 700° C., separating the resulting titanium chlorides from any iron chloride formed during chlorination, dissolving the titanium tetrachloride in aqueous solution to obtain a solution having a titanium concentration between about 150 grams and 350 grams per liter calculated as titanium dioxide, $TiO_2$, adding any separated iron chlorides formed during chlorination to the solution obtained from leaching of the ore, hydrolyzing the titanium chloride solution until over 90% of the titanium is precipitated as hydrous titanium oxide with formation of a hydrochloric acid mother liquor, washing and calcining the said hydrous titanium oxide, neutralizing substantially all the free hydrochloric acid contained in the iron chloride solution and reducing any ferric iron contained therein to ferrous condition, electrolyzing the neutralized and reduced solution at current densities of between about 2 and about 10 amperes per square decimeter to obtain metallic iron and chlorine gas, returning the hydrochloric acid hydrolysis mother liquor to a subsequent leaching of fresh ore and returning the electrolytically produced chlorine gas to the chlorination of the briquetted titanium residue obtained from the leaching.

4. Process according to claim 1 in which the iron-bearing titanium ore is ilmenite.

JOSEPH L. TURNER.
WALTER W. PLECHNER.

REFERENCES CITED

The following references are of record in the file of this patent:

UNITED STATES PATENTS

| Number | Name | Date |
|---|---|---|
| 1,325,561 | Farup | Dec. 23, 1919 |
| 1,528,319 | Carteret et al. | Mar. 3, 1925 |
| 1,899,573 | Kubelka | Feb. 28, 1933 |
| 1,899,574 | Kubelka | Feb. 28, 1933 |
| 2,062,133 | Kubelka | Nov. 24, 1936 |
| 2,287,082 | Bauer | June 23, 1942 |

FOREIGN PATENTS

| Number | Country | Date |
|---|---|---|
| 421,308 | Great Britain | Dec. 18, 1934 |